US 008254381B2

(12) United States Patent
Allen et al.

(10) Patent No.: US 8,254,381 B2
(45) Date of Patent: Aug. 28, 2012

(54) MESSAGE PROCESSING ENGINE WITH A VIRTUAL NETWORK INTERFACE

(75) Inventors: Nicholas Alexander Allen, Redmond, WA (US); John R Justice, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 113 days.

(21) Appl. No.: 12/020,575

(22) Filed: Jan. 28, 2008

(65) Prior Publication Data

US 2009/0190585 A1 Jul. 30, 2009

(51) Int. Cl.
H04L 12/28 (2006.01)

(52) U.S. Cl. ..... 370/389; 370/351; 370/357; 370/395.5; 370/398; 370/392; 370/465; 370/466; 370/467; 370/469; 370/476

(58) Field of Classification Search ............... 370/389, 370/351, 357
See application file for complete search history.

(56) References Cited

U.S. PATENT DOCUMENTS

| 6,463,056 | B1* | 10/2002 | Silva et al. | 370/356 |
|---|---|---|---|---|
| 6,578,084 | B1* | 6/2003 | Moberg et al. | 709/236 |
| 6,804,776 | B1* | 10/2004 | Lothberg et al. | 713/160 |
| 7,016,979 | B2* | 3/2006 | He et al. | 709/246 |
| 7,146,431 | B2 | 12/2006 | Hipp et al. | |
| 7,293,108 | B2 | 11/2007 | Warrier et al. | |
| 7,522,595 | B2* | 4/2009 | Ben-Dvora et al. | 370/389 |
| 7,643,455 | B2* | 1/2010 | Linder et al. | 370/338 |
| 7,697,434 | B1* | 4/2010 | Tripathi et al. | 370/235 |
| 7,738,457 | B2* | 6/2010 | Nordmark et al. | 370/392 |
| 2001/0012288 | A1 | 8/2001 | Yu | |
| 2002/0059388 | A1 | 5/2002 | Thompson et al. | |
| 2003/0014466 | A1* | 1/2003 | Berger et al. | 709/102 |
| 2004/0083356 | A1* | 4/2004 | Chatterjee et al. | 713/1 |
| 2005/0021768 | A1 | 1/2005 | Angermayr | |
| 2006/0089992 | A1* | 4/2006 | Blaho | 709/227 |
| 2006/0195617 | A1* | 8/2006 | Arndt et al. | 710/1 |
| 2006/0200565 | A1* | 9/2006 | Ng et al. | 709/227 |

(Continued)

FOREIGN PATENT DOCUMENTS

KR 1020010107790 A 12/2001

(Continued)

OTHER PUBLICATIONS

Brogle, et al., "Supporting IP Multicast Streaming Using Overlay Networks", Qshine'07, ACM, 2007, pp. 7.

(Continued)

Primary Examiner — Michael J Moore, Jr.
Assistant Examiner — Gautam Sharma
(74) Attorney, Agent, or Firm — Rau Patents, LLC

(57) ABSTRACT

A message processing engine may intercept outgoing and incoming messages by bridging an interface between a virtual network interface and a physical network interface. The message processing engine may have a raw packet analyzer that may determine if a packet is to be processed based on a policy, and then may decode the packet using a first set of protocols, perform a translation in the decoded state, then encode the packet using the same or a different set of protocols. The message processing engine may be used to perform translations to enable two otherwise incompatible devices to communicate as well as apply various protocols including security protocols to communications with another device similarly configured. In many embodiments, the raw packet analyzer may be a service with administrative privileges, but the decoder, encoder, and translator may be operated with user privileges.

20 Claims, 3 Drawing Sheets

U.S. PATENT DOCUMENTS

| | | | |
|---|---|---|---|
| 2007/0011272 A1* | 1/2007 | Bakke et al. | 709/217 |
| 2007/0047574 A1 | 3/2007 | Ling | |
| 2007/0192434 A1* | 8/2007 | Kodama et al. | 709/218 |
| 2007/0217415 A1 | 9/2007 | Wijnands et al. | |
| 2007/0280249 A1 | 12/2007 | Draves | |
| 2008/0301759 A1* | 12/2008 | Rivers et al. | 726/1 |

FOREIGN PATENT DOCUMENTS

| | | |
|---|---|---|
| KR | 1020060116893 A | 11/2006 |
| WO | WO98/51097 A2 | 11/1998 |

OTHER PUBLICATIONS

Rubini, "Virtual Network Interfaces", pp. 1-5.
Graf, "Implementing a Virtual Network Interface for Linux 2.6", Semester Thesis Aug. 3, 2006, pp. 39.
Yan, et al., "Security Infrastructure for a Web Service Based Resource Management System", Hewlett-Packard Company, 2002, pp. 15.
International Search Report and Written Opinion for PCT/US2008/088573 dated Aug. 18, 2009.

* cited by examiner

MESSAGE PROCESSING ENGINE WITH A VIRTUAL NETWORK INTERFACE

BACKGROUND

Communications between different devices are often facilitated by the adoption of various protocols to which each party to the communication attempts to implement. Protocols may be used to establish standardized communications between different services and applications that may be developed by different parties. Some protocols may be used to ensure a complete transmission of a message, prevent other devices from obtaining the message, to speed up message transmission, or for any other purpose.

When protocols are implemented by different parties, there is often some misinterpretation of the protocol specification or optional features within the specification that one party may implement and another party may not. Even small discrepancies may cause some communications to fail.

SUMMARY

A message processing engine may intercept outgoing and incoming messages by bridging an interface between a virtual network interface and a physical network interface. The message processing engine may have a raw packet analyzer that may determine if a packet is to be processed based on a policy, and then may decode the packet using a first set of protocols, perform a translation in the decoded state, then encode the packet using the same or a different set of protocols. The message processing engine may be used to perform translations to enable two otherwise incompatible devices to communicate as well as apply various protocols including security protocols to communications with another device similarly configured. In many embodiments, the raw packet analyzer may be a service with administrative privileges, but the decoder, encoder, and translator may be operated with user privileges.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
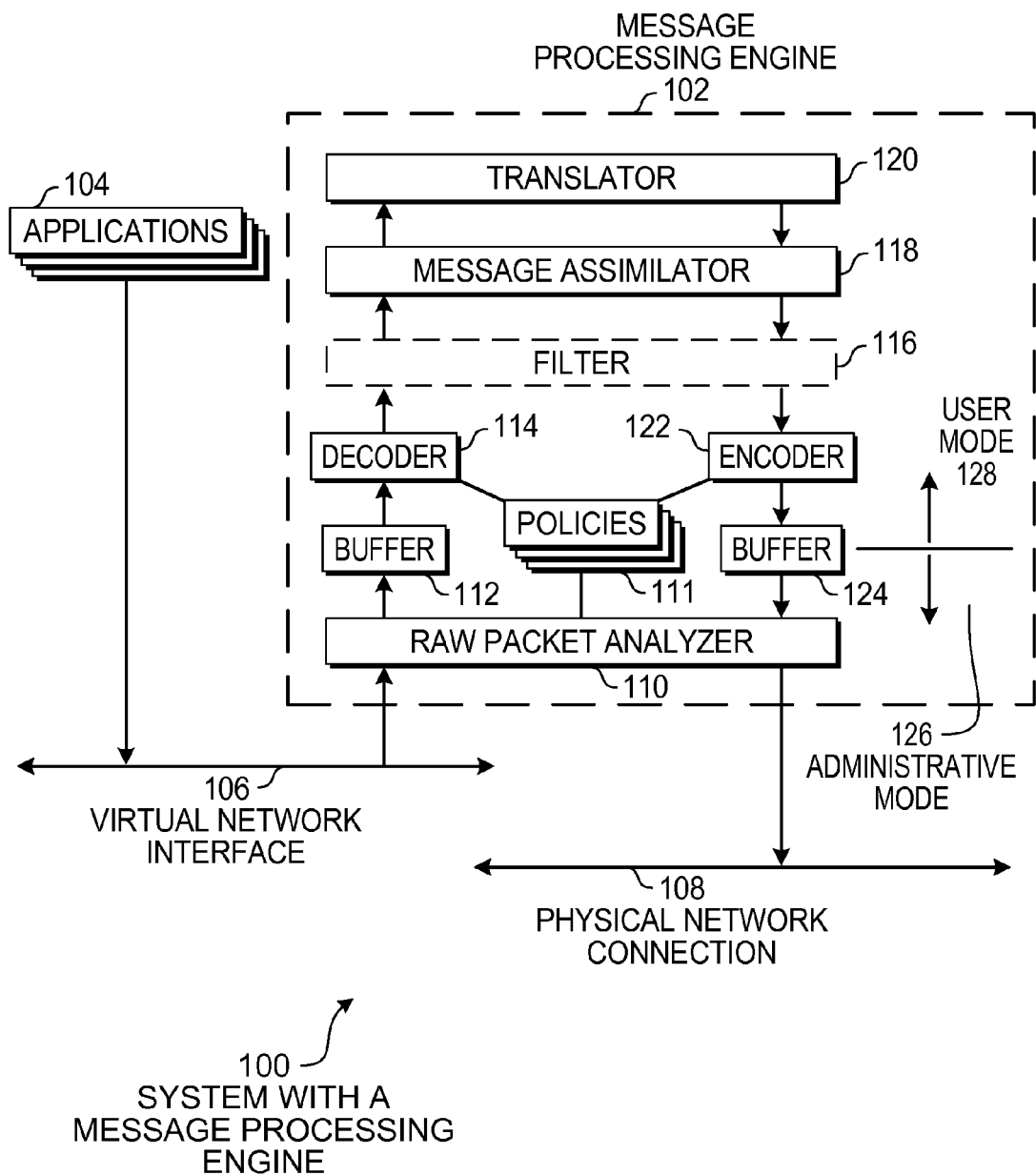
FIG. 1 is a diagram illustration of an embodiment showing a system with a message processing engine.

A message processing engine may operate with a virtual network interface to intercept and process incoming and outgoing messages. The message processing engine may be able to perform various translations or modifications to the messages at an application level, as well as modify the protocols used to transmit the messages.

In one use scenario, the message processing engine may be used to modify messages transmitted between two applications without any modification or change to either application. Such a use may be a mechanism to interface with legacy systems or application software for which no source code is available.

In another use scenario, two or more devices may use a message processing engine to interface with each other using various security protocols that were not applied by the applications that create the messages. One such embodiment may apply one or more security related protocols to the outgoing and incoming messages.

The message processing engine uses a virtual network interface to capture network communications with an application. The virtual network interface may function as a physical network interface but may be executed in software or firmware. The virtual network interface may enable a message processing engine to capture and route outgoing and incoming packets to perform various processing.

Communications that come across the virtual network interface may be directed through the message processing engine or to be passed to a physical network connection. Similarly, messages received on the physical network connection may be analyzed and processed in a similar manner. A set of policies may be used by a raw packet analyzer to disposition incoming and outgoing packets.

The policies used in the analysis may contain an identifying mechanism for the packets and protocols, translations, or other processing that may be applied to specific packets. In some embodiments, several different policies may be applied to different types of messages.

The message processing engine may unwrap a packet by decoding the packet using various protocols that may be associated with the packet and may process the message contained in the packet on an application level. In some cases, multiple packets may be aggregated to recreate the application level message. In other cases, a single packet may contain several application level messages.

Once an application level message is formed from one or more packets, various translations may be performed. The application level message may be in the same form as created by an application, prior to any protocols, encoding, or other processing that may be used for transporting the message across a network. After processing at the applications level, one or more packets may be created from the message and outgoing policies applied to the packets. The packets may then be transmitted along the physical network interface. Incoming packets may be handed by reversing the process.

In a use scenario where the message processing engine performs a translation operation, the decoding and encoding protocols may be the same protocols. In some other usage scenarios, the decoding and encoding protocols may be different protocols.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with a message processing engine. Embodiment 100 is a simplified example used to highlight various characteristics, features, and uses of a message processing engine.

The diagram of FIG. 1 illustrates functional components of a system and may not correspond directly with a hardware or software component of a system. In some cases, a component may be a hardware component, a software component, or a combination of hardware and software. Hardware components may include general purpose components adaptable to perform many different tasks or specially designed components that may be optimized to perform a very specific function. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the various functions described.

Embodiment 100 is an illustration of the functional components of a message processing engine 102 as part of an overall device, such as a computer system. The components illustrated in embodiment 100 may be part of a single device.

An application 104 may send a packet to the virtual network interface 106 through the normal course of operation. The virtual network interface 106 may be a software construct that simulates a physical network connection 108. The virtual network interface 106 may be installed in such a manner that the applications 104 transmit and receive network communication through the virtual network interface 106 rather than the physical network interface 108.

The physical network connection 108 may be a network connection that transmits and receives message on a physical connection outside of the operating device. In many embodiments, a computer device may have a hardwired Ethernet connection, a wireless connection, or some other physical interface to a network.

The message processing engine 102 may process incoming and outgoing messages between the virtual network interface 106 and the physical network connection 108. Each inbound and outbound packet may be analyzed to determine if the packet is to be processed by the message processing engine 102. If the message is not to be processed, the message may be transferred between the virtual network interface 106 to the physical network connection 108.

The arrows in embodiment 100 illustrate how an outgoing packet transmitted from an application 104 may be processed through the message processing engine 102. The message processing engine 102 may also apply a similar processing for incoming packets.

When the application 104 transmits a message, the message may be broken into multiple packets. In some cases, a single packet may contain several application level messages.

Packets transmitted to the virtual network interface 106 may be analyzed by the raw packet analyzer 110 that may analyze and disposition packets based on a policy 111. The raw packet analyzer 110 may either transfer the packet to the physical network connection 108 or may send the packet through the message processing engine 102.

The raw packet analyzer 110 may use a set of policies 111 that may define the type of packet to process and the various processing and translations that may be performed on that type of packet. The identifiers used by the raw packet analyzer 110 may be any characteristic of a packet. In some cases, a packet header or the packet contents may be examined to determine a packet type. In other cases, various routing information may be used such as a destination address, port, or other parameter.

Some embodiments may establish a communications session between an application 104 and an outside device or service and identify packets associated with the session. The session may be established through various handshaking or other communications. During the course of establishing the session, the raw packet analyzer 110 may determine that packets associated with the session are to be processed by the message processing engine 102.

When an outgoing packet is received on the virtual network interface 106 and the determination is made that the packet is to be processed, the packet may be placed in a buffer 112. The buffer 112 may enable the raw packet analyzer 110 to operate asynchronously with the remainder of the message processing engine 102.

The packet may then travel to a decoder 114 where the packet may be decoded using a set of protocols used by the application 104. The decoding process may remove whatever transformations, packaging, or configuration performed on the packet to return the packet contents to the original application level message.

Many applications use various protocols that may be used to facilitate communications between two or more processes. Examples of such protocols include TCP, SOAP, and many others. Some protocols may be used to ensure that a message arrives completely and is intact, while other protocols may encrypt or otherwise protect the data within the message from interlopers. In some embodiments, several protocols may be applied by the application 104 to a packet.

In some instances, a message processing engine 102 may be used to change the protocol associated with a packet and may not transform the packet at the application level. In such an instance, the filter 116 may transfer an outgoing packet from the decoder 114 to the encoder 122.

When an application level transformation is indicated for a packet, the packet may be transferred to a message assimilator 118. The message assimilator 118 may create an application level message from multiple packets or may create multiple application level messages from a single packet, depending on the case. In some cases, an application level message may be created by decoding the packets that make up the message, arranging the packets in a sequence, and aggregating the decoded packet contents together.

The translator 120 may perform any type of translation, transformation, or change to the application level message as defined in the policy 111 associated with the packet. In some cases, small changes may be made to the format of the application layer message, while in other cases comprehensive transformation of the message may occur. Each embodiment may have different types of changes that may be made, and such changes may be defined by complex algorithms or any other mechanism.

After the translator 120 modifies the application layer message, the message may be converted into packets, encoded with the same or a different set of protocols by the encoder 122, enter buffer 124, and be transmitted on the physical network connection 108 by the raw packet analyzer 110.

In some use scenarios, the encoder 122 may apply the same protocols to encode the packet as the decoder 114 did to decode the packet. In other embodiments, a different set of protocols may be applied by the encoder 122 than the decoder 114. Some use scenarios will be discussed later in this specification.

In many embodiments, the virtual network interface 106 may be a service that is operated with administrative or kernel level privileges. In many computing environments, kernel level services are generally highly privileged and may be created with special programming considerations. In such environments, the functions enabled by the kernel level services may be limited to avoid causing interference problems with other services especially when the kernel services have powerful privileges.

Embodiment 100 may be constructed so that the raw packet analyzer 110 and the virtual network interface 106 may be administrative mode 126 or kernel processes. The remaining portions of the message processing engine 102 as well as the applications 104 may be operated in a user mode 128 or with user specific privileges. The buffers 112 and 124 may serve as a bridge between the user mode 128 and administrative mode 126 processes.

By splitting the processes in this manner, a set of policies 111 may be used by the raw packet analyzer 110 to route packets through the message processing engine 102 or to the physical network connection 108. The remaining processes within the message processing engine 102 may be operated with the same user privileges as the application 104. In such embodiments, the various translators 120 and protocols used by the decoder 114 and encoder 122 may be installed, operated, and controlled on a user by user basis and with a user's permission settings.

Although illustrated as handling outgoing packets, embodiment 100 may also be used to process incoming packets in a similar fashion. When a packet is received on the physical network connection 108, the raw packet analyzer 110 may analyze the packet using the policies 111 and route the packet directly to the virtual network interface 106 or through the message processing engine 102.

An incoming message may then pass through the various steps of decoding, filtering, assimilation, and translation before being encoded and passed to the virtual network interface 106 and then to the application 104. In this manner, the message processing engine 102 may provide protocol changes and application level translation to both incoming and outgoing messages.

Figure 2:
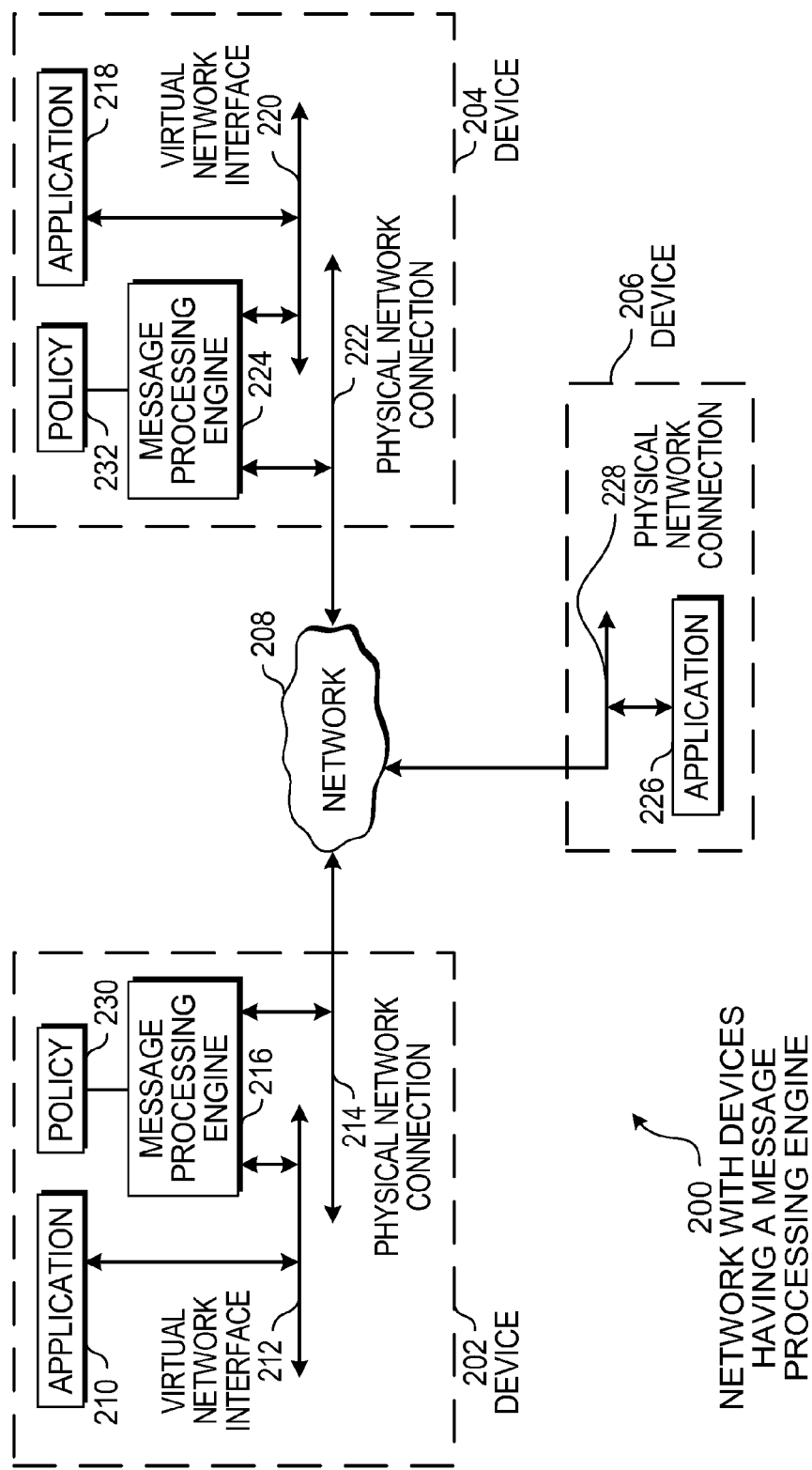
FIG. 2 is a diagram illustration of an embodiment showing a network with devices having a message processing engine.

FIG. 2 is a diagram illustration of an embodiment 200 showing a network with devices having a message processing engine. Embodiment 200 is a simplified example used to highlight various characteristics, features, and uses of a message processing engine in a network environment.

The diagram of FIG. 2 illustrates functional components of a system and may not correspond directly with a hardware or software component of a system. In some cases, a component may be a hardware component, a software component, or a combination of hardware and software. Hardware components may include general purpose components adaptable to perform many different tasks or specially designed components that may be optimized to perform a very specific function. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the various functions described.

Embodiment 200 illustrates different use scenarios of a message processing engine in a network environment. Devices 202 and 204 may connect to the network 208 and may each have a message processing engine. Device 206 may connect to the network 208 without a message processing engine.

Device 202 may be similar to embodiment 100 in that it may contain an application 210 that communicates with a virtual network interface 212. A message processing engine 216 may process incoming and outgoing messages and bridge between the virtual network interface 212 and a physical network connection 214. The physical network connection 214 is the connection between the network 208 and the device 202.

Similarly, device 204 may be similar to embodiment 100 in that it may contain an application 218 that communicates with a virtual network interface 220. A message processing engine 224 may process incoming and outgoing messages and bridge between the virtual network interface 220 and a physical network connection 222. The physical network connection 222 may be the connection between the network 208 and the device 204.

Device 206 has an application 226 that may communicate directly with a physical network connection 228, which may connect with the network 208.

Embodiment 200 may be used to illustrate several use scenarios for a message processing engine.

In one use scenario, a device with a message processing engine may connect to another device that does not have a message processing engine. In such a scenario, the message processing engine may be used to provide a translation between two applications or services. The translation may be a conversion from one messaging protocol to another and may also incorporate application level changes to the message contents.

In this use scenario, the message processing engine may be capable of providing a bridge or translation between two applications or services without making modifications to those applications or services.

For example, application 226 on device 206 may be a web service that is offered by a third party and hosted over the Internet. The application 226 may use a specific set of protocols for communicating with client devices that use the service. In the example, device 202 may be a client device that has a legacy application 210 that a developer wishes to connect with the application 226. The developer may create a policy 230 that may be used by the message processing engine 216 to connect the two applications. The message processing engine 216 may receive outgoing messages from application 210 with one set of protocols, decode the message, and encode the message in a set of protocols that application 226 can accept. Similarly, messages from application 226 may be received by the message processing engine 216, decoded, and encoded using a set of protocols expected by application 210.

In this use scenario, the virtual network interface 212 enabled the message processing engine 216 to intercept, analyze, and modify incoming and outgoing messages without having to modify the application 210 or the application 226. By defining a policy 230, a developer may enable communication between two applications that otherwise may not be able to communicate. From a user's perspective, the user may be able to install a policy 230 that may enable the user's application 210 to have additional functionality by interfacing with a remote service 226.

In many such scenarios, the message processing engine 216 may provide merely protocol changes to packets. One application may use an older version of a specific protocol while another uses a newer version and the versions may be slightly incompatible. The newer protocol may be used for improved security, for example. Such changes may be relatively simple from a technology standpoint, but when an older application 210 is in use on a client device and a remotely hosted service in application 226 are incompatible, the alternative solution may be to upgrade the older application 210. Instead, the a policy 230 may implemented that allows the older application 210 to send and receive messages across the virtual network interface 212 using the older protocol, while the message processing engine 216 ensures that communications across the network 208 may be compliant with the new protocol.

In some scenarios, the message processing engine 216 may provide application level translations of incoming and outgoing messages. Such a scenario may be useful when two applications attempt to implement two different versions of application level communications.

In another use scenario, message processing engines on two devices may be used for securing communications between the devices without using Virtual Private Network (VPN) or other point to point security mechanisms. In such a use scenario, devices 202 and 204 each have a message processing engine 216 and 224 with policies 230 and 232, respectively. Some embodiments may use multipoint or broadcast message transmission techniques.

The policies 230 and 232 may be configured to apply one or more security protocols to outgoing messages addressed to the other device and decode incoming messages using the security protocols. In this manner, the various communications across the network 208 between devices 202 and 204 may be secured merely by applying the appropriate policies 230 and 232.

Figure 3:
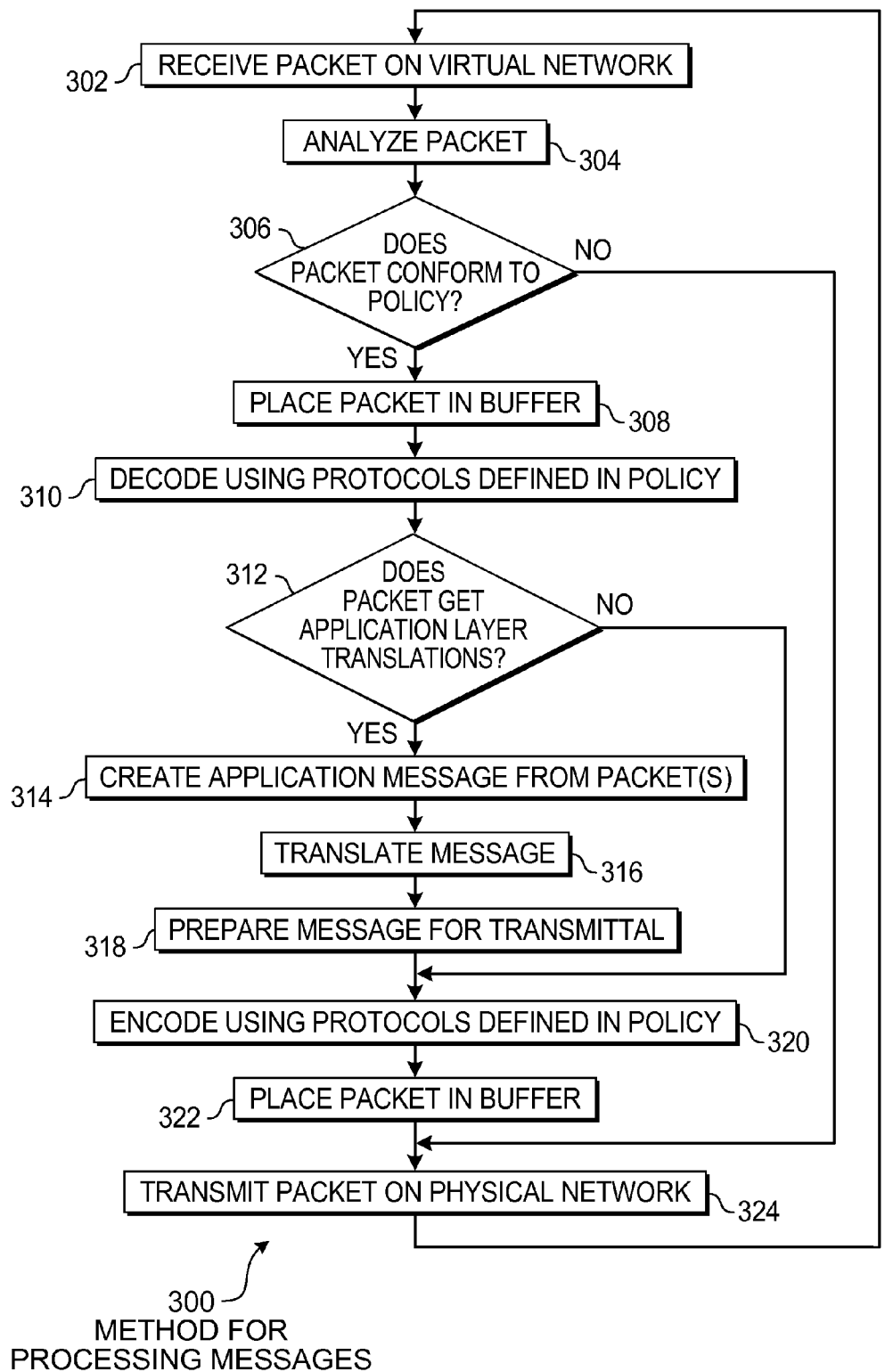
FIG. 3 is a flowchart illustration of an embodiment showing a method for processing messages.

FIG. 3 is a flowchart illustration of an embodiment 300 showing a method for processing messages. Embodiment 300 is a simplified example of a sequence of steps that may be used to process outgoing messages. Other embodiments may use different terminology or nomenclature and may include additional steps or may combine two or more steps into a single step. In other embodiments, some steps illustrated as serial may be performed in parallel and vice versa.

Embodiment 300 is an example of a method for processing outgoing messages. An incoming message may be handled in a similar manner.

A packet may be received on a virtual network interface in block 302. After processing, the packet may be transmitted on a physical network connection in block 324. In an embodiment handling an incoming message, the packet may be received on a physical network connection and transmitted on a virtual network interface. Both types of embodiments may process the packet in the same basic manner.

The packet may be analyzed in block 304 against a policy. The policy may define the type of packet that may be processed by a message processing engine. Such a policy may also define various protocols used to decode and encode the packet, as well as any translation that may be performed on the application level message.

If the packet does not conform to the policy in block 306, the packet is transmitted on the physical network connection in block 324. In such a case, the packet may be merely moved from the virtual network interface to the physical network connection without processing.

If the packet does conform to the policy in block 306, the packet may be placed in a buffer in block 308. The buffer may enable asynchronous operations of a raw packet analyzer that may perform the functions of blocks 304 and 306, with other portions of a message processing engine.

The packet may be decoded using protocols defined in the policy in block 310. The protocols may be any type of protocol that may be applied to a packet for transportation, security, or for any other reason.

If the packet does not get application layer translations in block 312, the process continues with encoding in block 320.

If the packet does get application layer translations in block 312, an application message may be created from one or more packets in block 314. In some embodiments, an application message may be transmitted in several packets. In other embodiments, a single packet may contain several application messages. In block 312, various packets may be buffered, organized, and aggregated into an application layer message.

The message may be translated in block 316. The translation may comprise any type of manipulation, addition, subtraction, analysis, transformation, or other change to the application layer message.

After translation, the message may be prepared for transmission in block 318. The message may be, for example, broken into separate packets for transmission. In some cases, two or more messages may be incorporated into a single packet.

The packet may be encoded using protocols specified in the policy in block 320. The encoding protocols may or may not be the same protocols that were used to decode the packet in block 310.

The packet may be placed in a buffer 322 and transmitted on the physical network in block 324.

The embodiment 300 is a simplified algorithm that may be used to capture, process, and transmit outgoing packets.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   receiving a first packet on a virtual network interface, said virtual network interface receiving all packets from a plurality of applications;
   after receiving said first packet on said virtual network interface, analyzing said first packet and determining that said first packet is of a first packet type, said first packet type being defined in a first policy;
   applying said first policy to said first packet by:
      decoding said first packet using a first set of protocols to create a first decoded packet; and
      encoding said first decoded packet using a second set of protocols to create a first recoded packet; and
   transmitting said first recoded packet on a physical network interface.

2. The method of claim 1 further comprising:
   receiving a second packet on said physical network interface;
   analyzing said second packet and determining that said second packet is of said first packet type;
   applying said first policy to said second packet by:
      decoding said second packet using said second set of protocols to create a second decoded packet;
      encoding said second decoded packet using said first set of protocols to create a second recoded packet; and
      transmitting said second recoded packet on said virtual network interface.

3. The method of claim 2, said second packet being a multicast packet.

4. The method of claim 1, said first packet being a multicast packet.

5. The method of claim 1, said receiving and said analyzing being performed by a process having administrative privileges and said decoding and encoding being performed by a process having user privileges.

6. The method of claim 1 further comprising:
   performing a translation of said first packet after said decoding and before said encoding.

7. The method of claim 4, said first set of protocols and said second set of protocols being the same set of protocols.

8. The method of claim 1 further comprising:
   receiving a third packet on said virtual network interface;
   analyzing said third packet and determining that said third packet is of a second packet type, said second packet type not being defined in said first policy; and
   transmitting said third packet on said physical network interface.

9. The method of claim 8, said first policy defining said first packet type as being related to a first application and a second policy defining said second packet type as being related to a second application.

10. A computer readable storage medium not comprising a signal but comprising computer executable instructions configured to perform the method of claim 1.

11. A device comprising:
   a virtual network interface operable within an operating system, said operating system further operating a plurality of applications said virtual network interface configured to send and receive all packets with said plurality of applications;
   a first policy comprising an identification mechanism for a first packet type, a first set of protocols, and a second set of protocols;
   a raw packet analyzer configured to receive a first packet and determine that said first packet is of a first packet type, said first packet type being defined in a first policy;
   a decoder configured to decode said first packet using said first set of protocols to create a decoded state for said packet;
   an encoder configured to encode said first packet from said decoded state using said second set of protocols; and
   a physical network connection.

12. The device of claim 11, said raw packet analyzer being configured to receive said first packet from said virtual network interface.

13. The device of claim 11, said raw packet analyzer being configured to receive said first packet from said physical network interface.

14. The device of claim 11, said first packet being a multicast packet.

15. The device of claim 11 further comprising:
   a translator configured to translate said first packet in said decoded state.

16. The device of claim 15, said first set of protocols and said second set of protocols being the same set of protocols.

17. The device of claim 11, said first packet type being associated with a first application.

18. The device of claim 11 further comprising a second policy comprising an identification mechanism for a second packet type, a third set of protocols, and a fourth set of protocols, said second packet type being associated with a second application.

19. The device of claim 18, said decoder further configured to decode using said third set of protocols and said encoder further configured to encode using said fourth set of protocols.

20. The device of claim 11, said raw packet analyzer being operated on an administrator authority and said encoder and said decoder being operated on a user authority.

* * * * *